No. 830,351. PATENTED SEPT. 4, 1906.
T. S. MILES.
INK WELL.
APPLICATION FILED APR. 24, 1906.

Witnesses
Frank B. Hoffman
D. W. Youed

Inventor
T. S. Miles
By Victor J. Evans
Attorney

UNITED STATES PATENT OFFICE.

THEODORE S. MILES, OF OMAHA, NEBRASKA.

INK-WELL.

No. 830,351.              Specification of Letters Patent.              Patented Sept. 4, 1906.

Application filed April 24, 1906. Serial No. 313,432.

*To all whom it may concern:*

Be it known that I, THEODORE S. MILES, a citizen of the United States, residing at Omaha, in the county of Douglas and State of Nebraska, have invented new and useful Improvements in Ink-Wells, of which the following is a specification.

The invention relates to an improvement in ink-wells, preferably constructed integrally and arranged to protect the ink against evaporation or deteriorating when the well is not in use.

The main object of the present invention is a production of a single structure arranged to provide an ink-reservoir and an integral trough in communication therewith, the reservoir being closed against the atmosphere, while the trough is provided with a cover to prevent evaporation of the ink when the well is not in use.

Another object of the invention is the production of means wherein the cover of the trough may be utilized as a funnel in filling the well.

The preferred details of the construction of the present invention will be described in the following specification, reference being had particularly to the accompanying drawings, in which—

Figure 1:
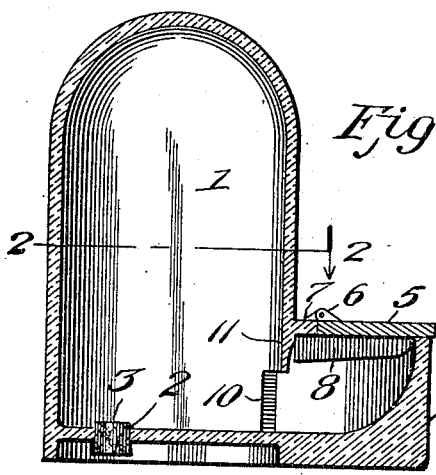
Figure 2:
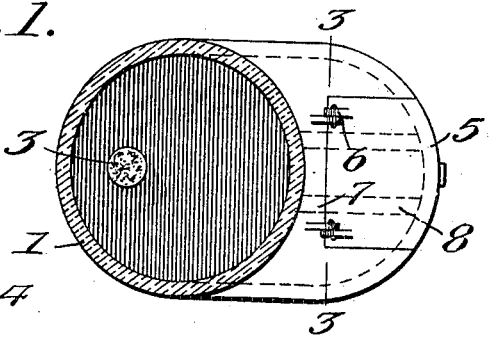
Figure 3:
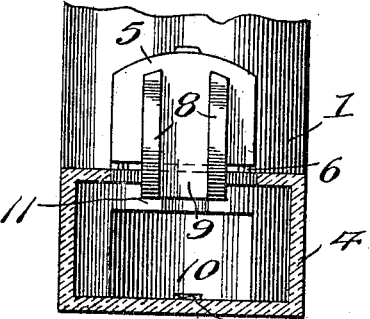
Figure 4:
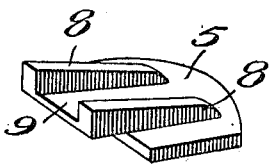
Figure 5:
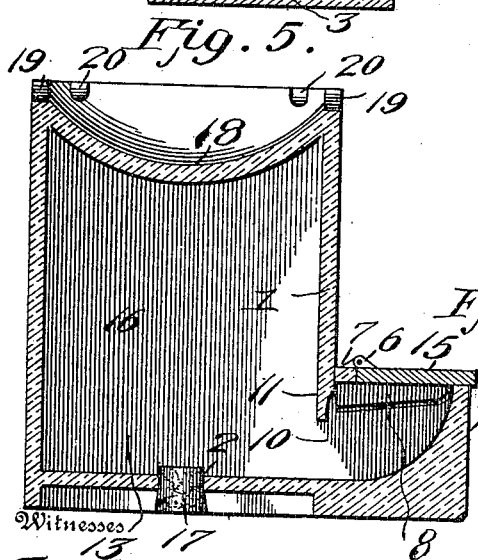
Figure 6:
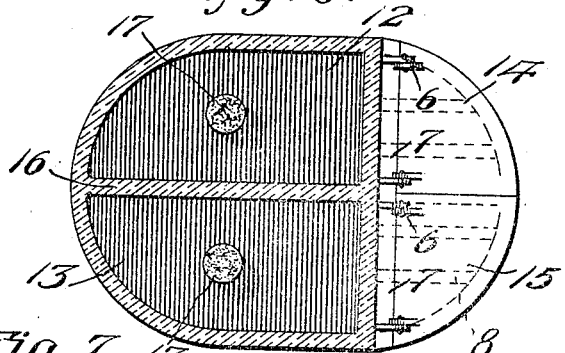
Figure 7:
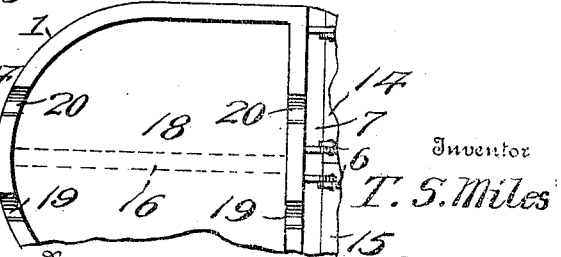

Figure 1 is a vertical central section of an ink-well constructed in accordance with my invention. Fig. 2 is a section of the same on line 2 2 of Fig. 1. Fig. 3 is a broken front elevation of the same, the cover being shown elevated. Fig. 4 is a bottom perspective of the cover. Fig. 5 is a vertical central section of a modified form of ink-well. Fig. 6 is a cross-section of the same. Fig. 7 is a broken plan of the same.

Referring particularly to the drawings, my improved ink-well comprises a reservoir 1, which may be of any desired size or shape. In the type shown in Figs. 1 to 3, inclusive, the reservoir is of cylindrical shape in section, with base or bottom wall thereof formed with an inlet 2, arranged to receive a stopper or cork 3. By preference the wall of the reservoir extends slightly below the bottom, so as to provide for the outward projection of the stopper 3.

From the forward portion of the reservoir at the lower end projects the trough member 4, the lower edge of which is on a plane with the lower edge of the reservoir. The trough is practically equal in width to the diameter of the reservoir, with the forward ends extending parallel to the longitudinal plane of the reservoir and rounded in plan approximately concentric with the curvature of the reservoir, as clearly shown in Fig. 2.

The trough is open at the upper end and is provided with a cover 5, having hinge connection at 6 with a ledge 7, projecting from the reservoir and in alinement with the upper end of the trough. The cover is of a size to completely close the trough-opening and is preferably constructed of the same material as the reservoir and trough. On the inner side of the cover is arranged a pair of spaced ribs 8, projecting from the lower surface of the cover and longitudinally of the same. The forward ends of the ribs terminate slightly in the rear of the forward or free edge of the cover, while their rear ends project beyond the rear edge of the cover and are in said projected portion provided with a connecting-web 9, which extends in the plane of the lower surface of the cover. The projecting portion of the ribs and web, which is hereinafter termed the "feeding-channel," rests beneath the ledge 7 when the cover is in closed position, as clearly shown in Fig. 1. The trough-bottom on its upper surface extends in coincidence with the bottom of the reservoir 1, the forward portion gradually curving forwardly and upwardly to the free edges of the trough. The trough is in communication with the reservoir through an opening 10 of less longitudinal and transverse dimension than the similar dimension of the trough proper, the upper boundary of the opening being displaced below the ledge 7, to provide which the forward wall of the reservoir extends below the said ledge in a form of a projection 11. This projection provides for a refilling of the trough from the reservoir as the material is used from the trough without the liability of overcharging the trough, as the material will rise in the latter only until the opening 10 is sealed, as will be obvious.

In Figs. 5, 6, and 7 the construction is shown as comprising duplicate reservoirs 12 and 13, and duplicate troughs 14 and 15, communicating therewith. This construction is preferably gained by forming the well proper with a transversely-arranged partition 16, dividing the same into the reservoirs, each of which had the usual filling-opening 17. In the use of the double reservoir it is obvious that they be may used for different-colored inks for convenience. If preferred, a single or double form of reservoir may be concaved or depressed at the top, as at 18, and provided about said concaved portion with an extending edge 19, in which is formed a series of recesses 20. By this construction the concavity 18 provides for the reception of pen-nibs, pins, or similar small articles, and the recesses 20 provide for conveniently supporting penholders, pencils, or the like. By preference the feed-channel is formed on each of the covers, and when using the same as a filling medium the ink-well is to be tipped rearward in order to permit the air in the reservoir to be displaced by the ink, the ink from the filling can or bottle being directed onto the cover between the ribs 8, which, together with the web 9, direct the ink into the trough and thence into the reservoir. The device as a whole is intended and primarily designed for integral formation from a single material, as glass or the like, though it is obvious that it may be sectional or otherwise constructed, if desired.

Having thus described the invention, what I claim as new is—

1. An ink-well comprising a reservoir, a trough in communication therewith, the upper boundary of the communicating opening between the trough and reservoir being below the upper open end of the trough, and a cover for the trough formed with a filling-channel.

2. An ink-well comprising a reservoir, a trough formed integral therewith, said trough being in communication with the reservoir through an opening having its upper boundary below the open end of the trough, a cover for the trough, ribs projecting from the lower surface of the cover and forming therewith a filling-channel.

3. An ink-well comprising a reservoir, a trough formed intergal therewith, the upper end of the reservoir being concaved and provided with a projecting edge formed with a series of notches.

In testimony whereof I affix my signature in presence of two witnessse.

THEODORE S. MILES.

Witnesses:
O. F. DRAFOLD,
J. H. BEXTEN.